United States Patent
Canoy et al.

(10) Patent No.: US 9,467,453 B2
(45) Date of Patent: Oct. 11, 2016

(54) NETWORK ACCESS AND CONTROL FOR MOBILE DEVICES

(71) Applicant: QUALCOMM Incorporated, San Diego, CA (US)

(72) Inventors: Michael-David Nakayoshi Canoy, San Diego, CA (US); Michael Orlando DeVico, San Diego, CA (US); Zachary David Rattner, San Diego, CA (US); Stephen Alton Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/531,283

(22) Filed: Nov. 3, 2014

(65) Prior Publication Data

US 2015/0237055 A1    Aug. 20, 2015

Related U.S. Application Data

(60) Provisional application No. 61/941,712, filed on Feb. 19, 2014.

(51) Int. Cl.

| | | |
|---|---|---|
| *G06F 21/00* | (2013.01) | |
| *H04L 29/06* | (2006.01) | |
| *H04W 4/20* | (2009.01) | |
| *H04W 12/00* | (2009.01) | |
| *H04W 12/08* | (2009.01) | |

(52) U.S. Cl.
CPC ......... *H04L 63/101* (2013.01); *H04L 63/0236* (2013.01); *H04L 63/10* (2013.01); *H04W 4/20* (2013.01); *H04W 12/00* (2013.01); *H04W 12/08* (2013.01)

(58) Field of Classification Search
CPC combination set(s) only.
See application file for complete search history.

(56) References Cited

U.S. PATENT DOCUMENTS

| | | | |
|---|---|---|---|
| 7,650,420 B2 | 1/2010 | Chong et al. | |
| 8,073,855 B2 | 12/2011 | Nagoya | |
| 8,274,985 B2 | 9/2012 | Haran et al. | |
| 2007/0288637 A1* | 12/2007 | Layton | G06F 21/10 709/226 |

(Continued)

FOREIGN PATENT DOCUMENTS

| | | |
|---|---|---|
| CN | 102497632 A | 6/2012 |
| JP | 5279439 B2 | 9/2013 |

OTHER PUBLICATIONS

International Search Report and Written Opinion—PCT/US2015/016385—ISA/EPO—Apr. 23, 2015.

*Primary Examiner* — Ghazal Shehni
(74) *Attorney, Agent, or Firm* — The Marbury Law Group, PLLC

(57) ABSTRACT

Systems, methods, and devices of the various embodiments enable content controls to be implemented by a modem of a mobile device to ensure the controls are implemented regardless of whether an application processor of the mobile device has been rooted. In an embodiment, content controls may be implemented by a modem or list component separate from the application processor when in a subsidized content delivery mode. In an embodiment, content controls may include a whitelist and/or a blacklist of IP addresses that addresses of content requests may be compared against to filter authorized content from unauthorized content. Content requests for authorized content may be sent to the content location, while content requests for unauthorized content may be dropped. In the various embodiments, a whitelist and/or blacklist may be updated on demand and/or automatically by a whitelist/blacklist management portal.

50 Claims, 13 Drawing Sheets

(56) References Cited

U.S. PATENT DOCUMENTS

| | | |
|---|---|---|
| 2009/0041036 A1 | 2/2009 | Batz et al. |
| 2009/0132718 A1 | 5/2009 | Groll et al. |
| 2012/0278229 A1* | 11/2012 | Vishwanathan ..... G06Q 20/123 705/40 |
| 2014/0280758 A1* | 9/2014 | Sharma ................. H04W 4/021 709/219 |

* cited by examiner

NETWORK ACCESS AND CONTROL FOR MOBILE DEVICES

RELATED APPLICATIONS

This application claims the benefit of priority to U.S. Provisional Patent Application No. 61/941,712 entitled "Network Access and Control for Mobile Devices" filed Feb. 19, 2014, the entire contents of which are hereby incorporated by reference.

BACKGROUND

In some situations, the costs to access digital content on mobile communication devices via a wireless data network, particularly the charges for using the wireless data network, may be subsidized by a content provider. However, to ensure a content provider's business model is protected in such situations, content providers need to ensure that such access to content is limited to the content sites that are approved by the content provider. For example, a school district may provide free Wi-Fi or subsidize cellular telephone network charges so that students may access school materials or research class-related topics via the Internet using their mobile devices when the students are using their mobile devices for schoolwork associated with school district approved content sites. However, the school district may want to protect against the students using subsidize delivery methods to download content from unapproved content sites in order to keep the cost associated with subsidized content delivery methods under control.

Current systems for controlling access to content are based on controls running on the application processor(s) of a mobile device, such as mobile device management ("MDM") applications, application reference to Internet Protocol ("IP") tables, etc. However, current systems fail to protect against the content controls running on the application processor being compromised on a "rooted" device. A "rooted" device is a mobile device on which a user, whether properly or improperly, is granted root level access on the application processor(s) of the mobile device (e.g., as super user, administrator, supervisor, etc.), thereby giving the user access to the application processor(s) sufficient to overcome content controls running on the application processor(s). By rooting a mobile device, the user can overcome content controls running on the application processor(s) to use a subsidized delivery method to access content that is not approved by the content provider. For example, a student with a "rooted" device may manipulate an IP routing table and/or disable a MDM application running on the application processor of her mobile device to allow her to use the school district subsidized delivery method (e.g., an LTE channel) to download content from unapproved content sites. The student's unauthorized use of the subsidized delivery method can result in an unwanted charge to the school district.

SUMMARY

The systems, methods, and devices of the various embodiments enable content controls to be implemented on a mobile device whether or not an application processor on the mobile device has been rooted. In an embodiment, content controls may be implemented in a subsidized content delivery mode and not implemented in an unsubsidized content delivery mode. In an embodiment, content controls may include a whitelist and/or a blacklist of IP addresses against which the addresses of content requests may be compared in order to filter or prevent access to unauthorized content while enabling the mobile device to access authorized content. Content requests for authorized content may be sent to the content location, while the mobile device may drop content requests for unauthorized content. In an embodiment, a modem of a mobile device may include a whitelist and/or a blacklist of IP addresses and the modem may filter requests for content based on the whitelist and/or blacklist. In an embodiment, a whitelist/blacklist component of a mobile device may include a whitelist and/or blacklist of IP addresses and the whitelist/blacklist component may interface with a modem of the mobile device to filter requests for content based on the whitelist and/or blacklist. In an embodiment, a server remote from a mobile device may include the whitelist and/or blacklist of IP addresses and a modem of the mobile device may interface with the remote server to verify content requests are authorized according to the whitelist and/or blacklist before sending content requests to content locations. In an embodiment, a server remote from a mobile device may include the whitelist and/or blacklist of IP addresses and a modem of the mobile device may send all content requests to the remote server. The remote server may filter requests for content based on the whitelist and/or blacklist. Thus, this embodiment enables filtering of content requests at the modem level, without involving the application processor. In the various embodiments, the whitelist and/or blacklist may be updated on demand and/or automatically by a whitelist/blacklist management portal.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
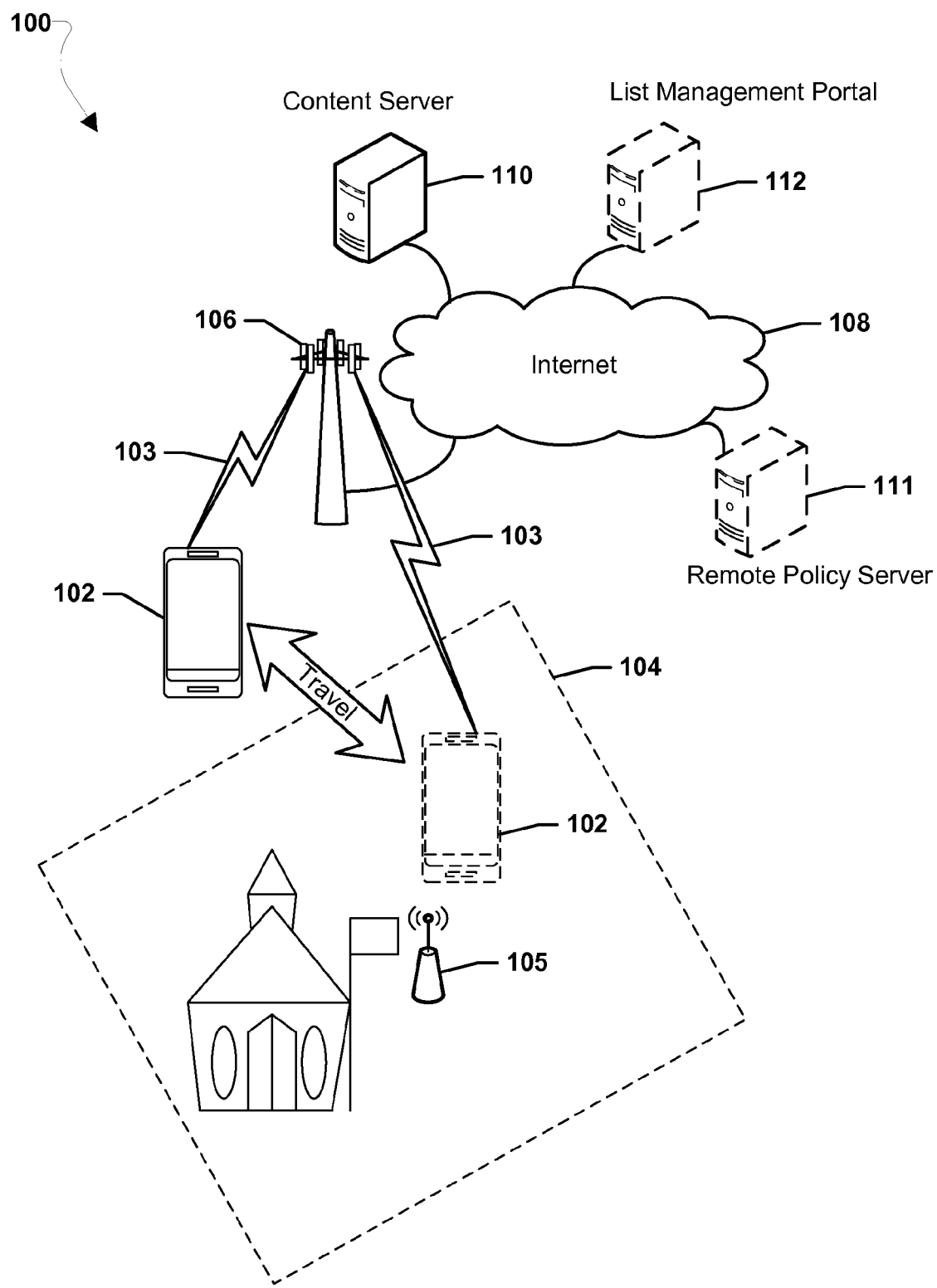
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "mobile device" is used herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include one or more programmable processor, memory, a modem, and/or other circuitry for requesting and receiving content.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device thereby enabling it to function as an Internet server (e.g., an enterprise e-mail server) only to the extent necessary to provide the functionality described herein.

As used herein, the term "rooted" refers to a mobile device on which a user, whether properly or improperly, is granted root level access on the application processor(s) of the mobile device (e.g., as super user, administrator, supervisor, etc.) giving the user access to the application processor(s) sufficient to overcome content controls running on the application processor(s). By rooting a mobile device, the user can overcome content controls running on the application processor(s) to use a subsidized content delivery method to access content that is not approved by the content provider. For example, a student with a "rooted" device may manipulate a MDM application running on the application processor of her device to allow her to use a school district subsidized content delivery method (e.g., an LTE channel) to download content from unapproved content sites.

The systems, methods, and devices of the various embodiments enable content controls to be implemented on a mobile device, whether or not an application processor on the mobile device has been rooted, by implementing content access filters that are independent of the application processor, such as filter mechanisms implemented by modems, additional components, and/or remote servers. Thus, the various embodiments enable the control of access to content by a mobile device using hardware that is independent of the application processor to filter content requests, such as content requests from the application processor or a remote policy server. Because the hardware implementing the content access restrictions is independent of the application processor and filters content requests independent of the application processor, a user is unable to disable the content controls by rooting the application processor.

In an embodiment, content controls may be implemented in a subsidized content delivery mode (e.g., a subsidized mode) and not implemented in an unsubsidized content delivery mode (e.g., an unsubsidized mode). As used herein, a subsidized content delivery mode (e.g., a subsidized mode) is a mode of accessing content via a network (e.g., the Internet) in which the costs to the user (e.g., wireless usage fees and content purchase or access fees) associated with downloading content via the modem are offset in part or completely by an entity other than the user of the mobile device. As used herein, an unsubsidized content delivery mode (e.g., an unsubsidized mode) is a mode of accessing content via a network in which the costs to the user associated with downloading content via the modem are paid for by the user of the mobile device.

A mobile device may be configured to operate in dual wallet modes, such as in a subsidized content delivery wallet mode at some times (e.g., when within a particular geofence when using a particular application) and in an unsubsidized content delivery mode at other times. For example, a school district may subsidize downloading content via the modem of a student's mobile device when the student is using his mobile device for school work associated with school district approved content sites (e.g., a school website), but may not subsidize downloading content via the modem of the student's mobile device when the student is not using his mobile device for school work.

In an embodiment, the application processor may control which wallet mode of a dual wallet mode the mobile device may operate in. The application processor may enable (e.g., start) a subsidized content delivery mode and disable (e.g., stop) a subsidized content delivery mode. The application processor may start or stop a subsidized content delivery mode in response to a trigger, which may be an indication received at the application processor and/or determination made by the application processor associated with starting and/or stopping subsidized content delivery modes. As an example, a button press event may indicate to the application processor that a student selected a subsidized delivery mode button, thereby triggering a subsidized delivery mode on his or her mobile device. As another example, a trigger may be when position information, such as latitude and longitude data from a Global Positioning System (GPS) receiver, indicates that the mobile device is located on school grounds, in which case the application processor may start a subsidize content delivery mode. As a further example, a trigger may include receiving a beacon signal (e.g., a Bluetooth® signal) from a wireless short range beacon transmitter within a school or on a school bus, in which case the application processor may start a subsidized content delivery mode on a student's mobile device.

In an embodiment, the day of week and time of day may affect the triggering of the subsidized content delivery mode, or may be used as independent triggers. For example, the subsidized content delivery mode may be enabled only during school hours when the student's mobile device is on school grounds, thus combining a geofence trigger with a day of week (e.g., Monday-Friday) and time of day (e.g., 8 AM to 5 PM) triggers or filters. As another example, the subsidized content delivery mode may be enabled automatically after school hours, such as after 6 PM. Such day of week and time of day triggers may be assessed individually or in combination with other triggers (e.g., location or receipt of a proximity beacon signal) and user inputs (e.g., a button press).

In an embodiment, an application processor may send subsidized content delivery mode start indications and subsidized content delivery mode stop indications to a modem of the mobile device in response to the application processor receiving triggers to start a subsidized content delivery mode. In response to receiving a subsidized mode start indication, the modem may start the subsidized content delivery mode and enable whitelist and/or blacklist filtering of content requests from the application processor. The modem may stop a subsidized content delivery mode and disable whitelist and/or blacklist filtering in response to receiving a subsidized content delivery mode stop indication from the application processor. For example, in response to receiving a start subsidized content delivery mode indication/command and/or stop subsidized content delivery mode indication/command the modem may set one or more flags in a memory of the modem and act according to the flag states to enable or disable whitelist and/or blacklist filtering as described below.

In an embodiment, content controls may include a whitelist and/or a blacklist of IP addresses to which addresses of content requests may be compared in order to filter authorized content from unauthorized content, i.e., allow access to authorized content while blocking or not enabling access to unauthorized content. For example, content requests for authorized content may be sent to the content location, while content requests for unauthorized content may be dropped. In an embodiment, a whitelist may be a list of addresses, such as a list of authorized IP addresses or URLs, domain names, TCP/UDP ports, combinations of one or more of IP addresses or URLs, domain names, TCP/UDP ports, etc., and a content request may be authorized when a comparison of the address of the content request to the whitelist of addresses determines that the address of the content request is on the whitelist of addresses. In an embodiment, a blacklist may be a list of addresses, such as IP addresses or URLs, domain names, TCP/UDP ports, combinations of one or more of IP addresses or URLs, domain names, TCP/UDP ports, etc., and a content request may be authorized when a comparison of the address of the content request to the blacklist of addresses determines that the address of the content request is not on the blacklist of addresses.

In an embodiment, a modem of a mobile device may include a whitelist and/or blacklist of IP addresses addresses/URLs and the modem may filter requests for content based on the whitelist and/or blacklist. The whitelist and/or the blacklist may include regular expression-style URLs so individuals (e.g., teachers) identifying sites for inclusion in either list may add to the list by identifying the URL without determining its IP address. Also, the whitelist and/or the blacklist my include IP addresses and URLs for certain pages within a website to enable whitelisting and blacklisting of particular pages without whitelisting or blacklisting the whole site. The whitelist and/or blacklist of IP addresses/URLs may be stored in a memory of the modem. A whitelist/blacklist management portal, such as a web server, may host whitelist/blacklist rules. For example, the web server may host rules for a school or an entire school district. The whitelist/blacklist management portal may modify a whitelist and/or blacklist stored on a whitelist/blacklist database. For example, by updating the whitelist to include IP address 206.190.79.226, a school administrator may allow subsidized access to content stored at IP address 206.190.79.226.

The modem may periodically check the whitelist/blacklist database for updates and download and store the relevant portions, such as all the list, merely the updated portions of the lists, or lists specific to the mobile device (e.g., a whitelist or blacklist tailored to a specific student's classes), in the modem memory. In an embodiment, updates to the whitelist and/or blacklist on the modem may occur on demand or may be pushed to the modem automatically. For example, at a given time the modem may request the latest update from the whitelist database and may subsequently add IP address 206.190.79.226 to the whitelist stored on the modem.

A benefit of a whitelist and/or blacklist being stored in memory on a modem is that the modem may control whether a content request is sent or dropped by consulting its internal whitelist and/or blacklist database without interaction with the application processor or memory of the mobile device that could be subject to modification by the user. Thus, in a subsidized content delivery mode, the modem may compare addresses of content requests to the addresses on the whitelist and/or blacklist stored in its memory to determine whether content requests are authorized or unauthorized, and send authorized content requests and drop/ignore unauthorized content requests. In an embodiment, a modem that maintains the whitelist and/or blacklist in its own memory may have more non-volatile RAM memory than a modem that does not check a whitelist and/or blacklist.

In an embodiment, a list component, such as a whitelist/blacklist component, of a mobile device may include a whitelist and/or blacklist of IP addresses/URLs and the list component, such as the whitelist/blacklist component, component may interface with a modem of the mobile device to filter requests for content based on the whitelist and/or blacklist. In an embodiment, the list component, such as the whitelist/blacklist component, may be a hardware component that is separate from the modem and the application processor and includes its own processor and memory. In an embodiment, the list component, such as the whitelist/blacklist component, and the modem may be implemented as separate components on a single chip. In an embodiment, the modem and list component, such as the whitelist/blacklist component, may be implemented in different cores of a multi-core processor. In a subsidized content delivery mode, when the modem receives a content request the modem may identify the address associated with the content request and send the address (or an indication of the address) to the whitelist/blacklist component. The whitelist/blacklist component may compare the address of content requests to the addresses on the whitelist and/or blacklist to determine whether content requests are authorized or unauthorized, and indicate to the modem whether the content requests are authorized or unauthorized. The modem may send authorized content requests and may drop unauthorized content requests.

A benefit of using a whitelist/blacklist component configured to work in conjunction with a modem to filter content requests is that the checking of the whitelist and/or blacklist by the whitelist/blacklist component may be accomplished without impacting modem performance (e.g., CPU clock speed, RAM usage, etc.). In such an embodiment, the modem interfacing with a whitelist/blacklist component may include interface circuitry for interfacing with the whitelist/blacklist component. In an embodiment, the modem may pass whitelist and/or blacklist updates from a whitelist management portal to the whitelist/blacklist component to enable the whitelist/blacklist component to update the whitelist and/or blacklist.

In an embodiment, a list management portal (e.g., a whitelist/blacklist management portal), such as a server, remote from a mobile device may include the whitelist and/or blacklist of IP addresses/URLs and a modem of the mobile device may interface with the remote list management portal, such as the whitelist/blacklist management portal/server, to verify whether content requests are authorized according to the whitelist and/or blacklist maintained on the portal/server before forwarding content requests to the content hosting locations. In a subsidized content delivery mode, the modem may send indications of the address of requests for content to the whitelist/blacklist management portal/server. The whitelist/blacklist management portal/server may compare addresses of content requests to the addresses on the whitelist and/or blacklist to determine whether the content requests are authorized or unauthorized, and may indicate to the modem whether the content requests are authorized or unauthorized. For example, the portal/server may send acknowledged ("ACK") or not acknowledged ("NACK") messages to the modem to indicate that requests are authorized or unauthorized, respectively. The modem may send authorized content requests and may drop or ignore unauthorized content requests. In this manner, the modem may only request external content (e.g., websites) when approved by the whitelist/blacklist management portal/server. A benefit of verifying content requests with the whitelist/blacklist management portal/server is that the whitelist/blacklist management portal/server need not be responsible for tunneling traffic, which may reduce the load on the whitelist/blacklist management portal/server compared to acting as a VPN device, thereby enhancing the data throughput to the modem.

In an embodiment, a whitelist/blacklist management portal/server remote from a mobile device may include the whitelist and/or blacklist of IP addresses/URLs, and a modem of the mobile device may send all content requests to the whitelist/blacklist management portal/server in a subsidized content delivery mode. The whitelist/blacklist management portal/server may filter requests for content based on the whitelist and/or blacklist. The whitelist/blacklist management portal/server may act as a proxy that either passes requests through for authorized addresses or drops packets for unauthorized destinations. A benefit of passing request through to the whitelist/blacklist management portal/server for filtering is that the modem may not require overhead for whitelist and/or blacklist comparisons. In this embodiment, the whitelist/blacklist management portal/server may be configured as a virtual private network ("VPN") style server.

FIG. 1 illustrates a network system 100 suitable for use with the various embodiments. The network system 100 may include multiple devices, such as a mobile device 102 configured to communicate via a wide area wireless network through one or more cellular towers or base stations 106, and one or more servers 110, 111, and 112 connected to the Internet 108. The mobile device 102 may exchange data via one or more connections, including wide area network ("WAN") cellular connections 103, such as CDMA, TDMA, GSM, PCS, 3G, 4G, LTE, etc. or any other type cellular connection, with the cellular tower or base station 106. The cellular tower or base station 106 may be in communication with a router which may connect to the Internet 108. In this manner, via the connections to the cellular tower or base station 106, and/or Internet 108, data may be exchanged between the mobile device 102 and the server(s) 110, 111, and 112. In an embodiment, the server 110 may be a content server, such as a web server hosting pages and other content associated with a website. In an embodiment, the server 111 may be a remote policy server, such a policy server sending content requests to the mobile device to direct the mobile device to download specific content. In an embodiment, the server 112 may be a list management portal, such as a whitelist/blacklist management portal, operated by an entity subsidizing content delivery to the mobile device 102 via the cellular network including the mobile device 102 and the cellular tower or base station 106. While features of mobile devices, modems, and servers described herein may be described with reference to WAN cellular connections and modems, these features may be used with other type connections, both wired and wireless, and other type mobile devices, modems, and servers. WAN cellular connections, modems, and servers are used herein merely to illustrate features of the various embodiments and are not intended to limit the various embodiments in any way. Other type mobile devices, modems, and servers may be used with the various embodiments, and the other mobile devices, modems, and servers may be substituted in the various examples without departing from the spirit or scope of the invention.

In an embodiment, the entity subsidizing content delivery to the mobile device 102 via the cellular network including the mobile device 102 and the cellular tower or base station 106 may only subsidize the delivery of content part of the time. For example, the server 112 may be operated by a school district subsidizing airtime for a student using mobile device 102 when the mobile device 102 is located in a geofence 104 defining the grounds of a school in the school district. The mobile device 102 may be a dual wallet mode device configured to operate in a subsidized content delivery mode and an unsubsidized content delivery mode. For example, the mobile device 102 may operate in an unsubsidized content delivery mode when outside the geofence 104, but may switch to operating in a subsidized content delivery mode when the mobile device 102 travels into the geofence 104. In this manner, a school district may only pay to subsidize airtime for student using mobile device 102 when the student is at school.

Mobile devices 102 may determine their location, and particularly their position within a geofence 104 using any of a number of technologies. In some embodiments, mobile devices 102 may determine their location using a global positioning system (GPS) receiver and compare their locations to coordinate boundaries of the geofence 104. In some embodiments, mobile devices 102 may compare the cell tower identifier (ID) of the cell tower 106 with which they are connect to cell tower IDs correlated to geofences 104. For example, a school geofence 104 may be defined by the cell tower ID of the closest cell tower 106. In some embodiments, mobile devices 102 may determine that they are within a geofence 104 upon reception of signals from a wireless proximity beacon 105 that broadcasts signals with a reception range that defines the geofence 104. For example, a wireless proximity beacon 105 may broadcast Bluetooth® signals that may be received by mobile devices 102 configured with an application that enables them to obtain an ID of the wireless proximity beacon 105 from the signals and recognize when reception of signals with that ID indicates the mobile device is within the geofence 104. In some embodiments, the process of recognizing the wireless proximity beacon ID and/or correlating the ID with a particular geofence 104 may involve a mobile device 102 transmitting a sighting message including the ID to a server 110, 112 via the cellular data network and the Internet 108, the server 110, 112 recognizing the ID, and the server 110, 112 informing the mobile device 102 via a response message of either the geofence 104 or of the need to activate or deactivate a subsidized content delivery mode.

FIGS. 2A-2D are component block diagrams illustrating some embodiment systems for controlling access to content by a mobile device.

Figure 2A:
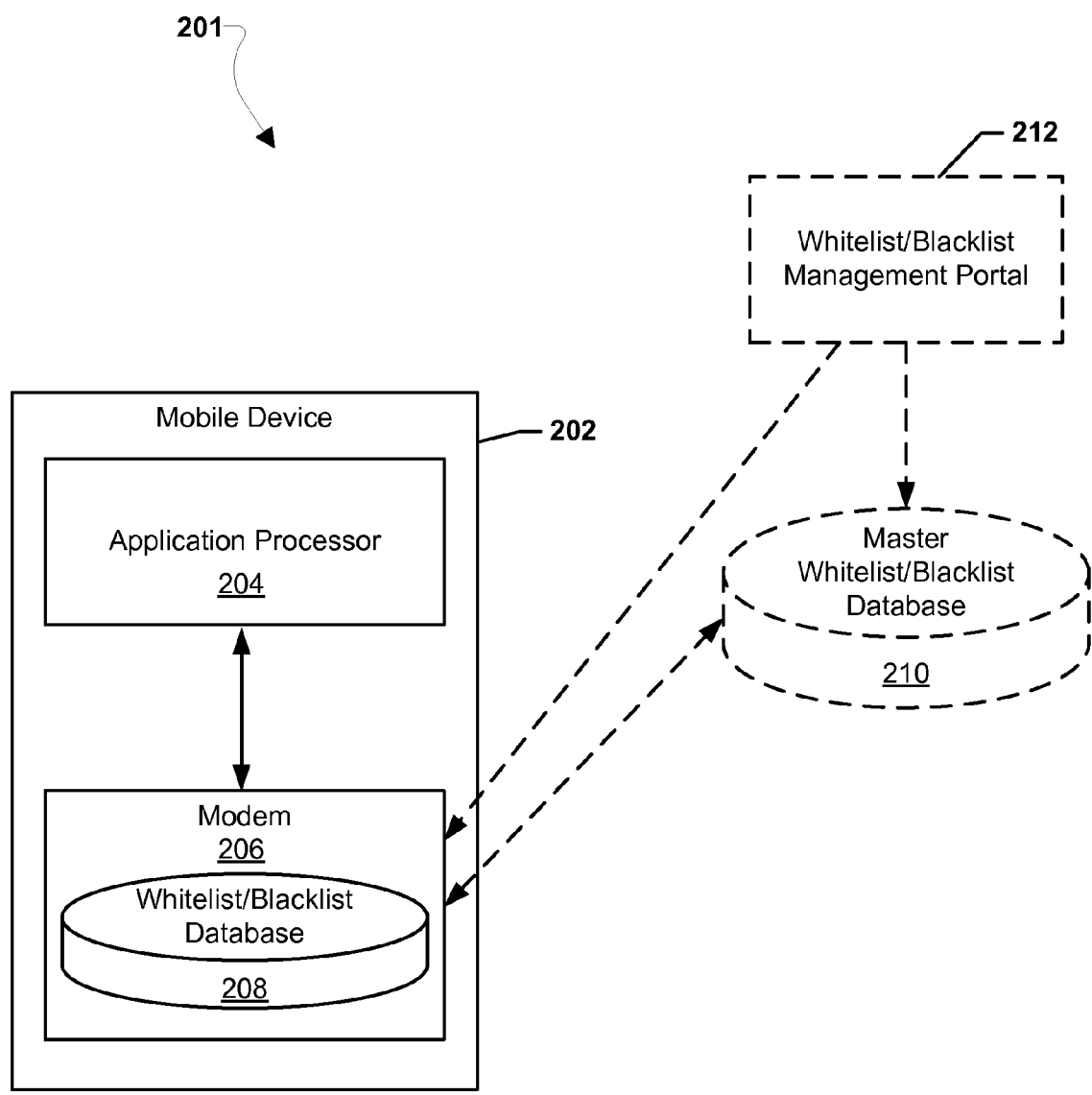
FIGS. 2A-2D are component block diagrams illustrating embodiment systems for controlling access to content by a mobile device.

FIG. 2A illustrates an embodiment system 201 including a mobile device 202 and optionally a whitelist/blacklist management portal 212 hosting a master whitelist/blacklist database 210. The mobile device 202 may include an application processor 204 connected to a modem 206. The modem 206 may include a memory storing a whitelist/blacklist database 208. The whitelist/blacklist database 208 may include IP addresses on one or more whitelist and/or blacklist. The application processor 204 may send indications to start or stop a subsidized content delivery mode to the modem 206 and the application processor 204 may send content requests, such as HTTP Get( ) requests, to the modem 206. Alternatively, a mobile device may be configured to start or stop a subsidized content delivery mode without signaling the modem by maintaining the device in the subsidized content delivery mode indefinitely, such as through provisioning of the modem.

In a subsidized content delivery mode, the modem 206 may filter the content requests from the application processor 204 against the whitelist/blacklist database 208. The modem 206 may identify the address of the content request by any method, including by identifying data in the address request itself, or by IP/TCP/HTTP header snooping, which involves the modem processor looking at the packet structure for the fields of interest without data modification. The address of the content request may be compared to the whitelist/blacklist database 208, and based on the comparison of the address of the content request to the list of addresses in the database 208, the modem 206 may determine whether the content request is authorized or unauthorized. Authorized content requests may be sent from the modem 206 to their content locations, while unauthorized content requests may be dropped. The authorized content received in response to an authorized content request may be passed from the modem 206 to the application processor 204.

In an optional embodiment, a list management portal, such as whitelist/blacklist management portal 212, may send updates to a master whitelist/blacklist database 210, and the modem 206 may access the master whitelist/blacklist database to update the whitelist/blacklist database 208. Alternatively, the whitelist/blacklist management portal 212 may send updates for the whitelist/blacklist database directly to the modem 206 or may push updates to the modem automatically through the master whitelist/blacklist database 210.

Figure 2B:
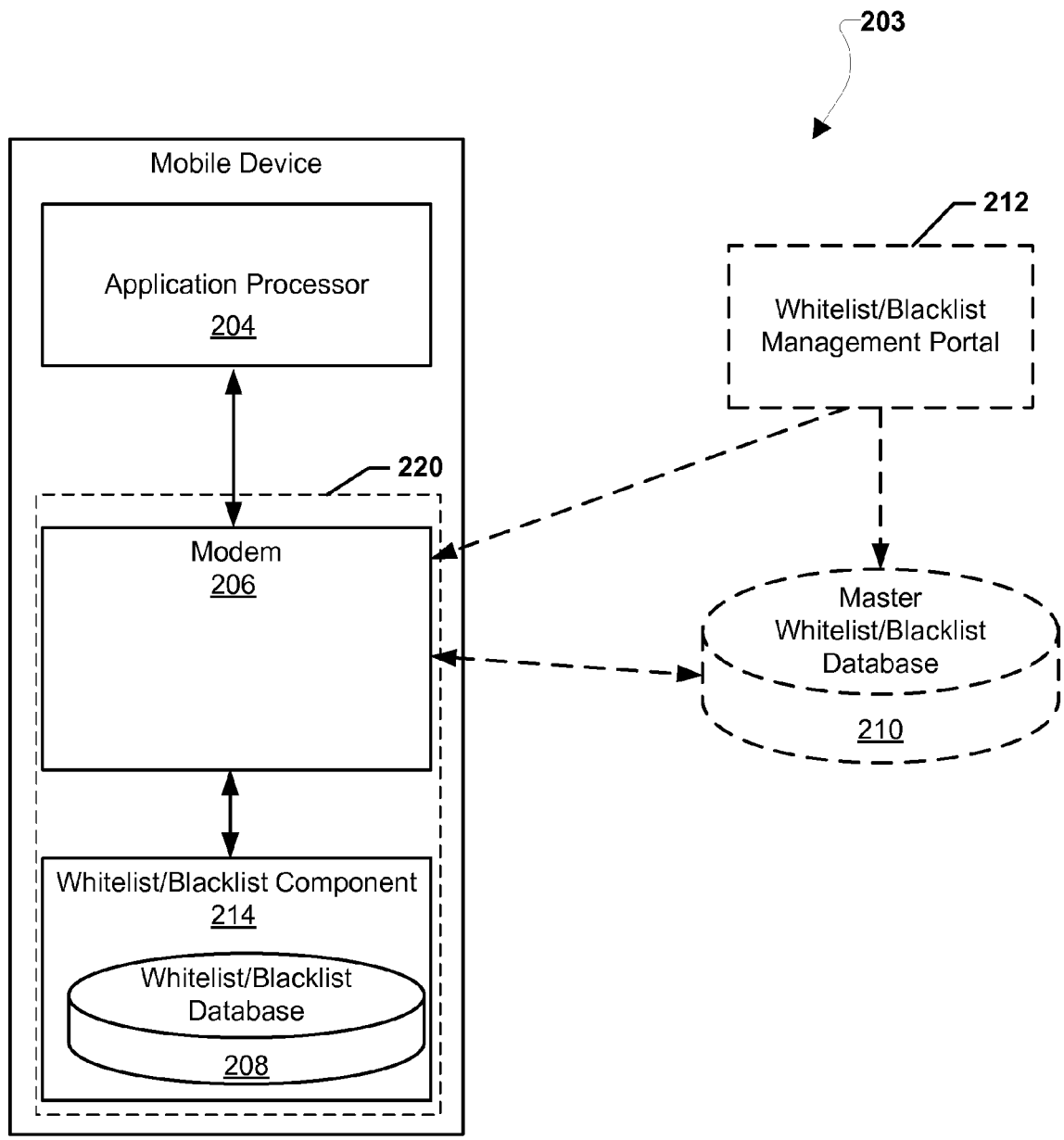

FIG. 2B illustrates an embodiment system 203 similar to the system 201 described above with reference to FIG. 2A, except that the whitelist/blacklist database 208 may be stored in whitelist/blacklist component 214 separate from the modem 206. The modem 206 may be connected to the whitelist/blacklist component 214 and may send indications of the address of content requests to the whitelist/blacklist component 214 in a subsidized content delivery mode. The whitelist/blacklist component 214 may compare the addresses of the content requests to the whitelist/blacklist database 208, and indicate whether the content requests are authorized or unauthorized to the modem 206. The whitelist/blacklist component 214 may include a processor and memory. The whitelist/blacklist component 214 may be a separate core from the modem 206 in a multi-core processor. The whitelist/blacklist component 214 and the modem 206 may be hardware components on the same chip 220 as part of a system on chip design. The whitelist/blacklist component 214 may received updates for the whitelist/blacklist database 208 via the modem 206 from the whitelist/blacklist management portal 212 and/or master whitelist/blacklist database.

Figure 2C:
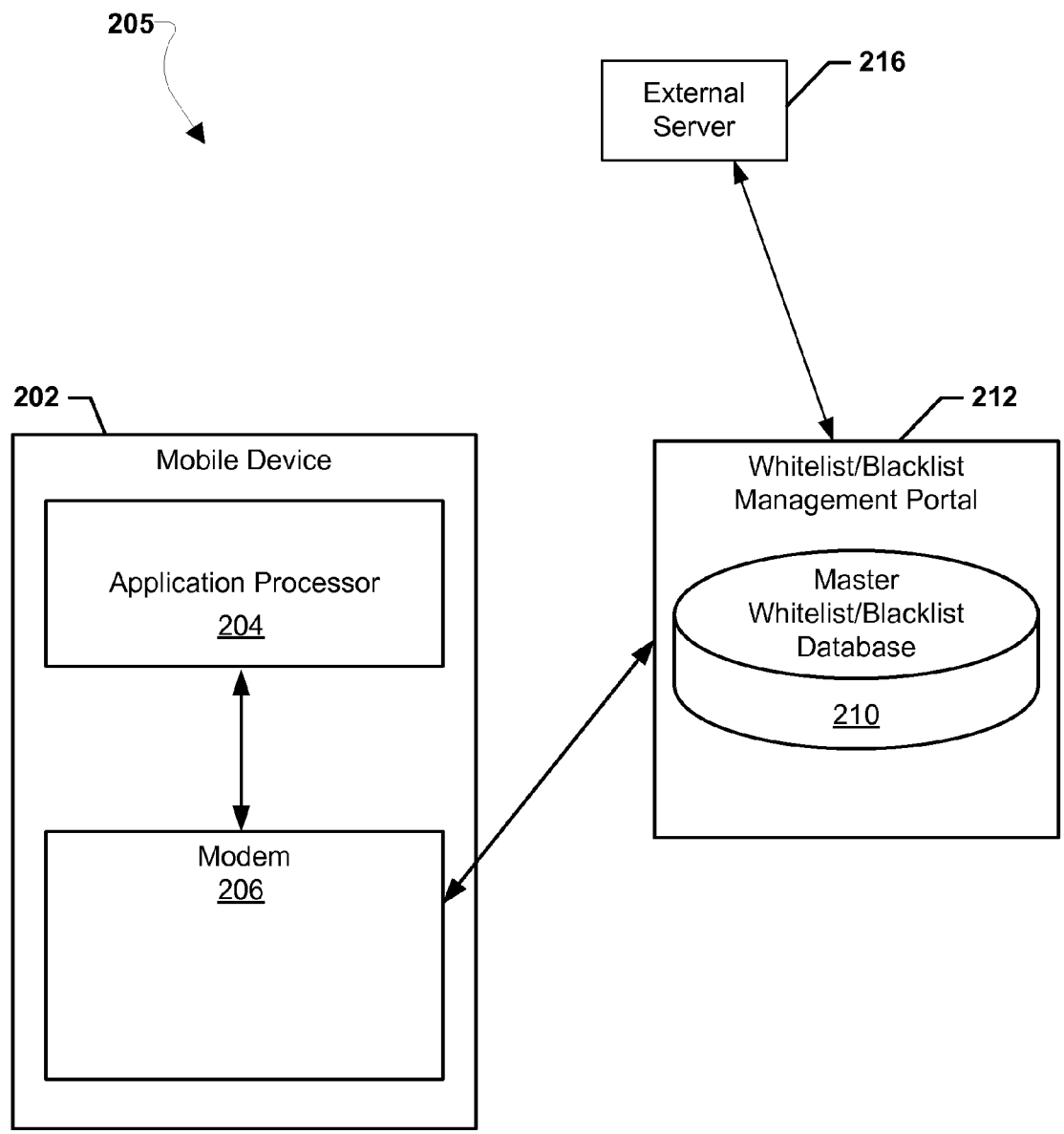

FIG. 2C illustrates an embodiment system 205 similar to the system 201 described above with reference to FIG. 2A, except that there may be no whitelist/blacklist database 208 stored in the mobile device 202. In a subsidized content delivery mode, the modem 206 may send all content requests to the list management portal, such as the whitelist/blacklist management portal 212, which may act as a proxy filtering the content requests against the master whitelist/blacklist database 210. Authorized content requests may be passed to the external server 216 corresponding to the address of the content request, while unauthorized content requests may be dropped. Authorized content may be sent through the whitelist/blacklist management portal 212 to the modem 206 and on to the application processor 204.

Figure 2D:
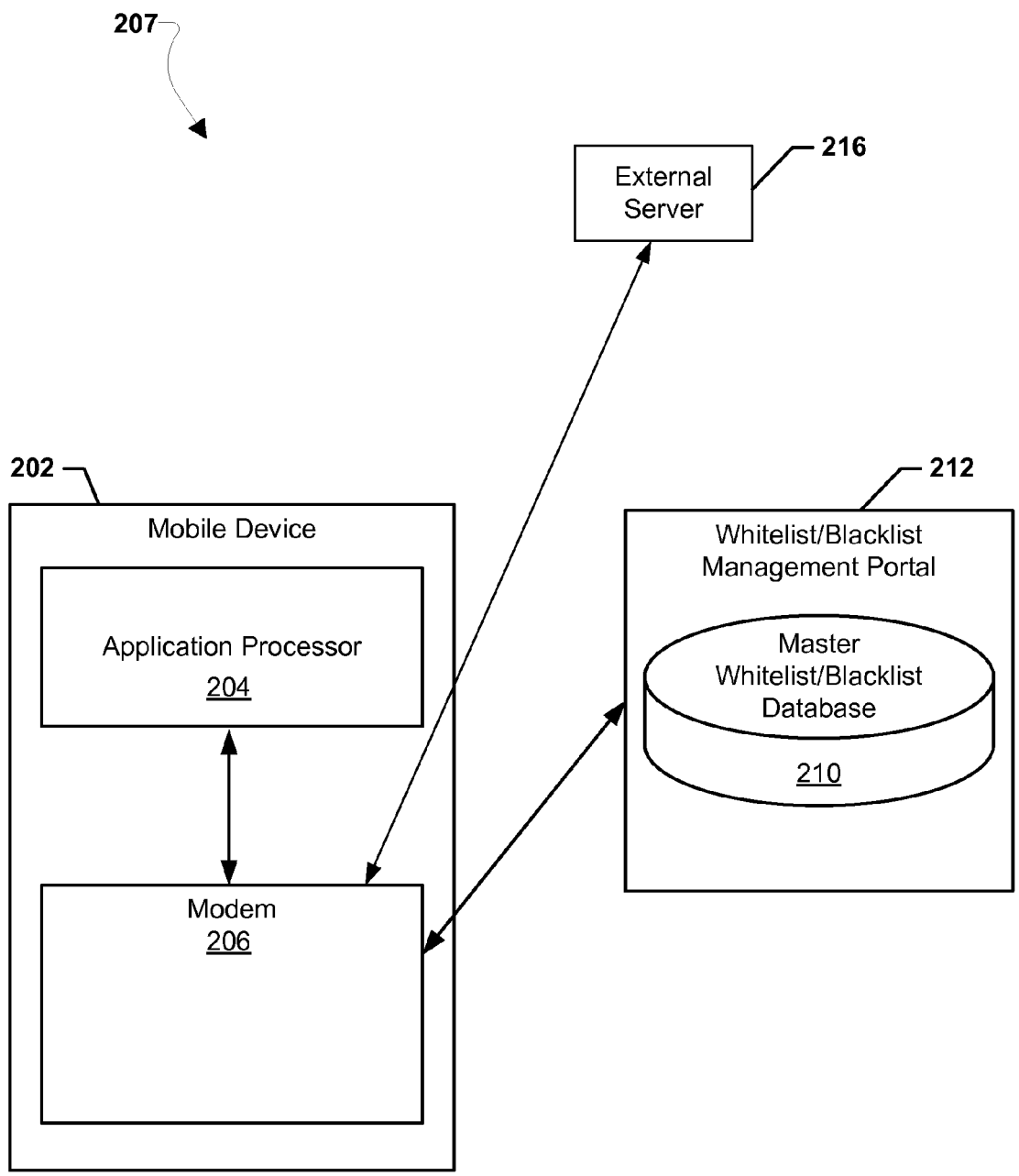

FIG. 2D illustrates an embodiment system 205 similar to the system 201 described above with reference to FIG. 2A, except that there may be no whitelist/blacklist database 208 stored in the mobile device 202. In a subsidized content delivery mode, the modem 206 may send indications of all content requests (or the content requests themselves) to the list management portal, such as the whitelist/blacklist management portal 212, which may filtering the addresses of the content requests against the master whitelist/blacklist database 210. Indications of authorized content requests (or the authorized content requests themselves) may be passed from the whitelist/blacklist management portal 212 to the modem 206, and the modem 206 may send the authorized content requests to the external server 216 corresponding to the address of the content request. Indications of unauthorized content requests may be sent to the modem 206 and the unauthorized content requests may be dropped. Authorized content may be sent from the external server 216 to the modem 206 and on to the application processor 204.

Figure 3:
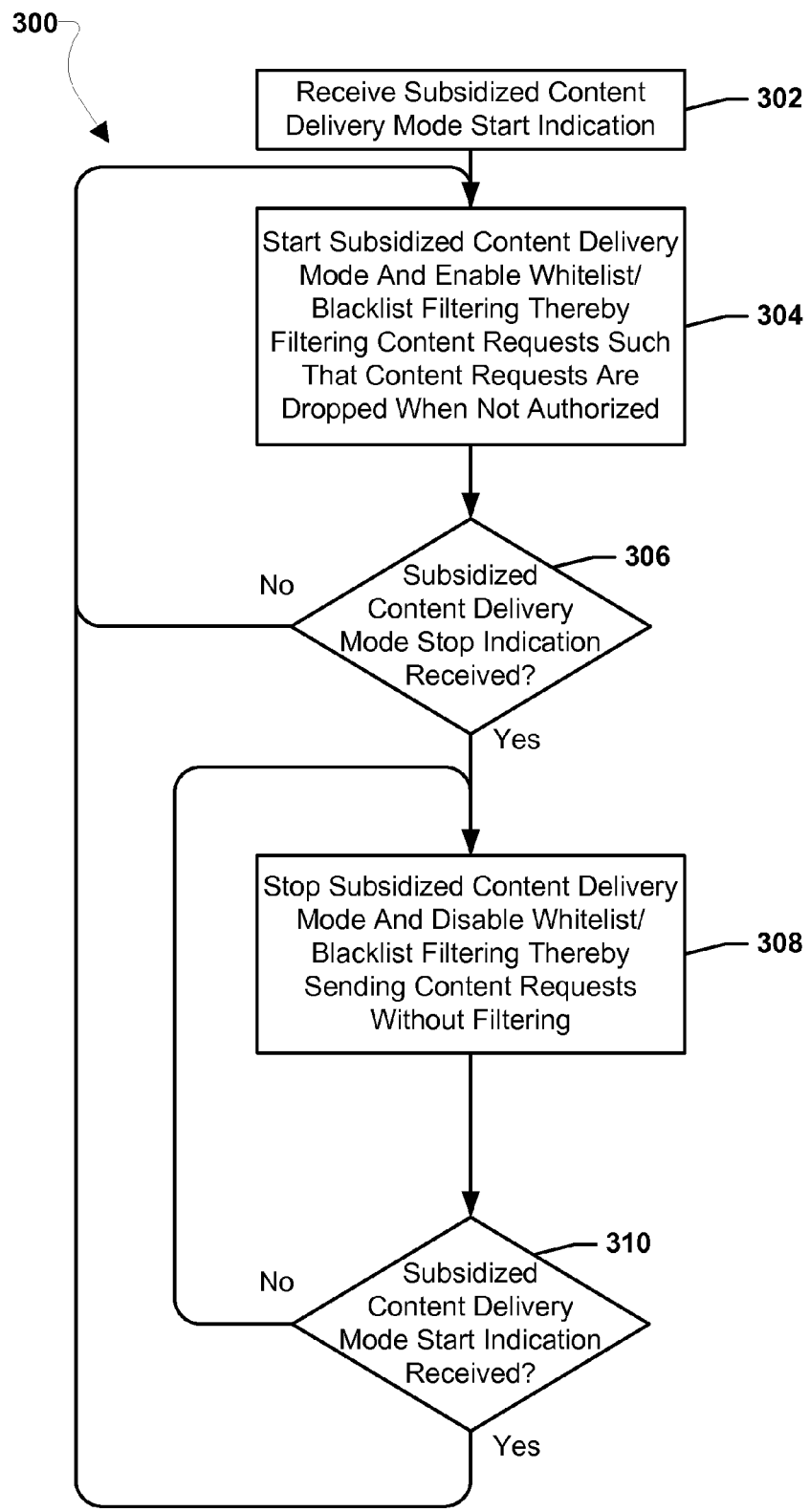
FIG. 3 is a process flow diagram illustrating an embodiment method for starting a subsidized content delivery mode on a mobile device modem.

FIG. 3 illustrates an embodiment method 300 for starting a subsidized content delivery mode on a mobile device modem. In an embodiment the operations of the method 300 may be performed by a processor of a mobile device modem in communication with an application processor of the mobile device. In block 302 the modem may receive a subsidized content delivery mode start indication. In an embodiment, the subsidized content delivery mode start indication may be message, flag setting or command indicating that the application processor has entered a subsidized content delivery mode in response to a trigger, such as a location matching a geofence condition, reception of a beacon signal, a button press event, etc.

In block 304 the modem may start the subsidized content delivery mode and enable whitelist and/or blacklist filtering thereby filtering content requests such that content requests are dropped when not authorized. In an embodiment, the modem may start the subsidized content delivery mode by setting a flag in the modem memory indicating that the subsidized content delivery mode is activated. When the subsidized content delivery mode is activated the modem may take actions to cause content requests from the application processor to be filtered against whitelists and/or blacklists, such as by performing operations of one or more of methods 400, 500, 600, and 700 described below with reference to FIGS. 4, 5, 6, and 7. In this manner, when the subsidized content delivery mode is activated, a content request may be filtered such that the content request is dropped when not authorized.

In determination block 306 the modem may determine whether a subsidized content delivery mode stop indication is received from the application processor. In response to determining a subsidized content delivery mode stop indication is not received (i.e., determination block 306="No"), the modem may continue in a subsidized content delivery mode and continue to enable whitelist and/or blacklist filtering in block 304.

In response to determining a subsidized content delivery mode stop indication is received (i.e., determination block 306="Yes"), in block 308 the modem may stop or deactivate the subsidized content delivery mode and disable whitelist and/or blacklist filtering thereby sending content requests without filtering. In an embodiment, the modem may stop/deactivate the subsidized content delivery mode by clearing a flag in the modem memory that indicates the activation state of the subsidized content delivery mode. When the subsidized content delivery mode is stopped/deactivated the modem may perform in a conventional manner, and thus not take actions to filter content requests so that all content requests may be sent by the modem to their address location. In this manner, when the subsidized content delivery mode is not activated, content requests may be sent without filtering.

In determination block 310 the modem may determine whether a subsidized content delivery mode start indication is received from the application processor. In response to determining that a subsidized content delivery mode start indication is not received (i.e., determination block 310="No"), the modem may continue in an unsubsidized content delivery mode in block 308. In response to determining that a subsidized content delivery mode start indication is received (i.e., determination block 310="Yes"), the modem may start/activate the subsidized content delivery mode and enable whitelist and/or blacklist filtering in block 304.

Figure 4:
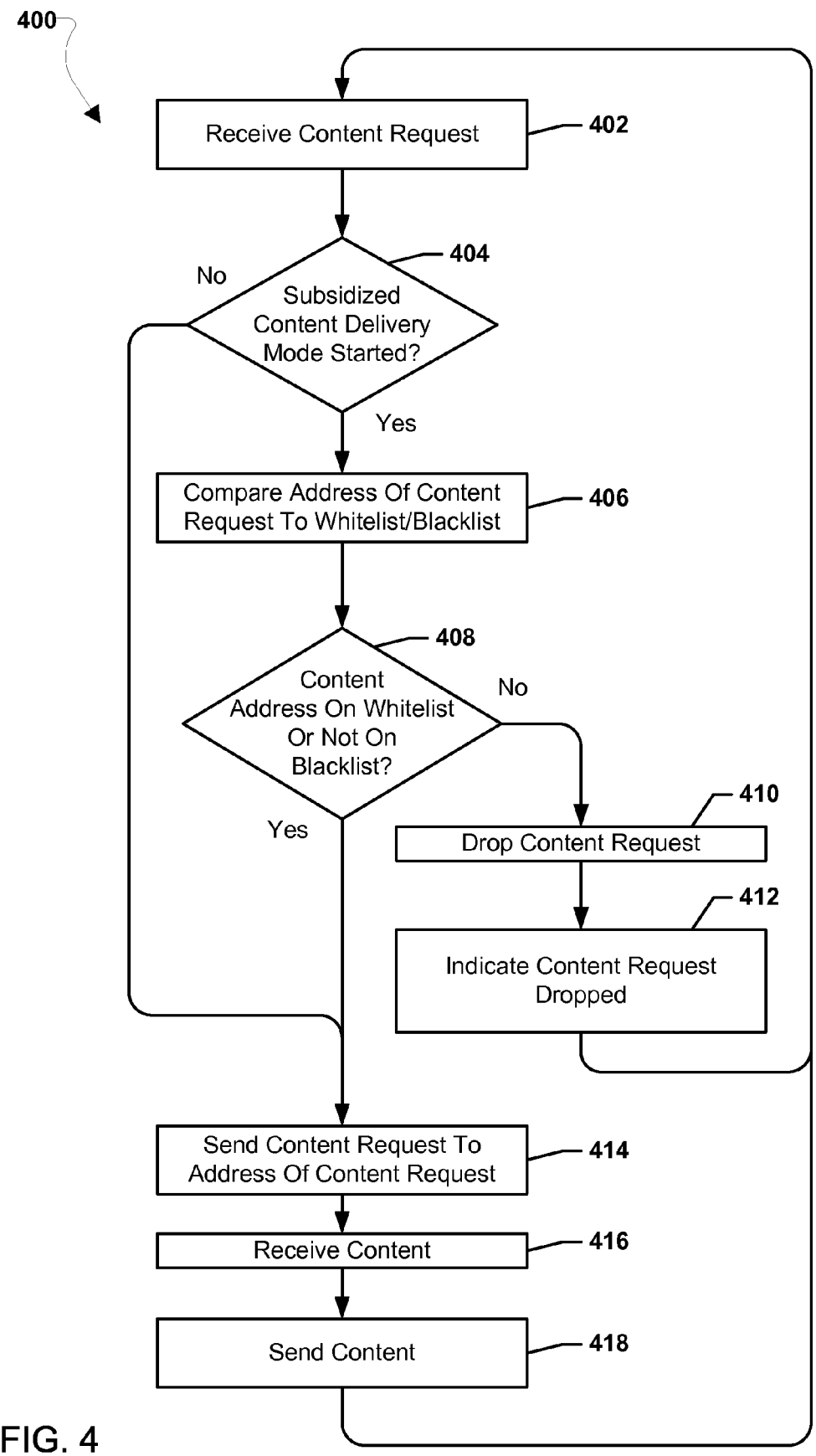
FIG. 4 is a process flow diagram illustrating an embodiment method for controlling access to content by a mobile device.

FIG. 4 illustrates an embodiment method 400 for controlling access to content by a mobile device. In an embodiment the operations of method 400 may be performed by a processor of a mobile device modem in communication with an application processor of the mobile device and/or another entity, such as a remote policy server. In an embodiment, the operations of method 400 may be performed when a subsidized content delivery mode is activated in method 300 described above with reference to FIG. 3.

In block 402 the modem may receive a content request. The content request may be received from the application processor or from another entity, such as a remote policy server, without going through the application processor. The content request may include a request for content at an address, such as a specific IP address or URL. In determination block 404 the modem may determine whether a subsidized content delivery mode is activated. For example, the modem may check a flag bit setting in a memory of the modem corresponding to the wallet mode (e.g., subsidized content delivery mode or unsubsidized content delivery mode) to determine whether a subsidized content delivery mode is activated.

In response to determining that the subsidized content delivery mode is activated (i.e., determination block 404="Yes"), in block 406 the modem may compare the address of the content request to a whitelist and/or blacklist stored in the modem memory. In an embodiment the whitelist and/or blacklist may be a list of addresses, such as IP addresses and URLs, stored in the modem memory. In determination block 408 the modem may determine whether the content address is on the whitelist or not on the blacklist. This determination in block 408 may compare an address of the content request that is a regular expression-style URL against listing of regular expression-style URLs in the whitelist or blacklist. Also, the determination of whether the content address is on the whitelist or not on the blacklist may be performed for URLs of pages within a website and not the whole site. In this manner, the modem may determine whether the content request is authorized based on the comparison of the address of the content request to the list of addresses. In response to determining that the content is not authorized (i.e., determination block 408="No"), the modem may drop the content request in block 410. In block 412 the modem may indicate that the content request was dropped. In an embodiment, the modem may indicate that the content request was dropped to the application processor and/or another entity, such as a remote policy server, thereby enabling the application processor and/or the other entity to indicate to the user that the content request was blocked. As an example, the modem may send a specialized status code to the application processor, such as an HTTP response code, indicating that the content request was dropped. In this manner, the modem may not completely ignore the unauthorized content request. Upon indicating that the content request was dropped, the modem may return to block 402 to receive the next content request.

In response to determining that the content request is authorized (i.e., determination block 408="Yes"), or in response to determining that the subsidized content delivery mode is not activated (i.e., determination block 404="No"), the modem may send the content request to the address of the content request in block 414. In block 416 the modem may receive the content from the location (e.g., a server) at the address of the content request. In block 418 the modem may send the content. In an embodiment, the modem may send the content to the application processor and/or another entity, such as a remote policy server. Upon sending the content, the modem may return to block 402 to receive the next content request.

Figure 5:
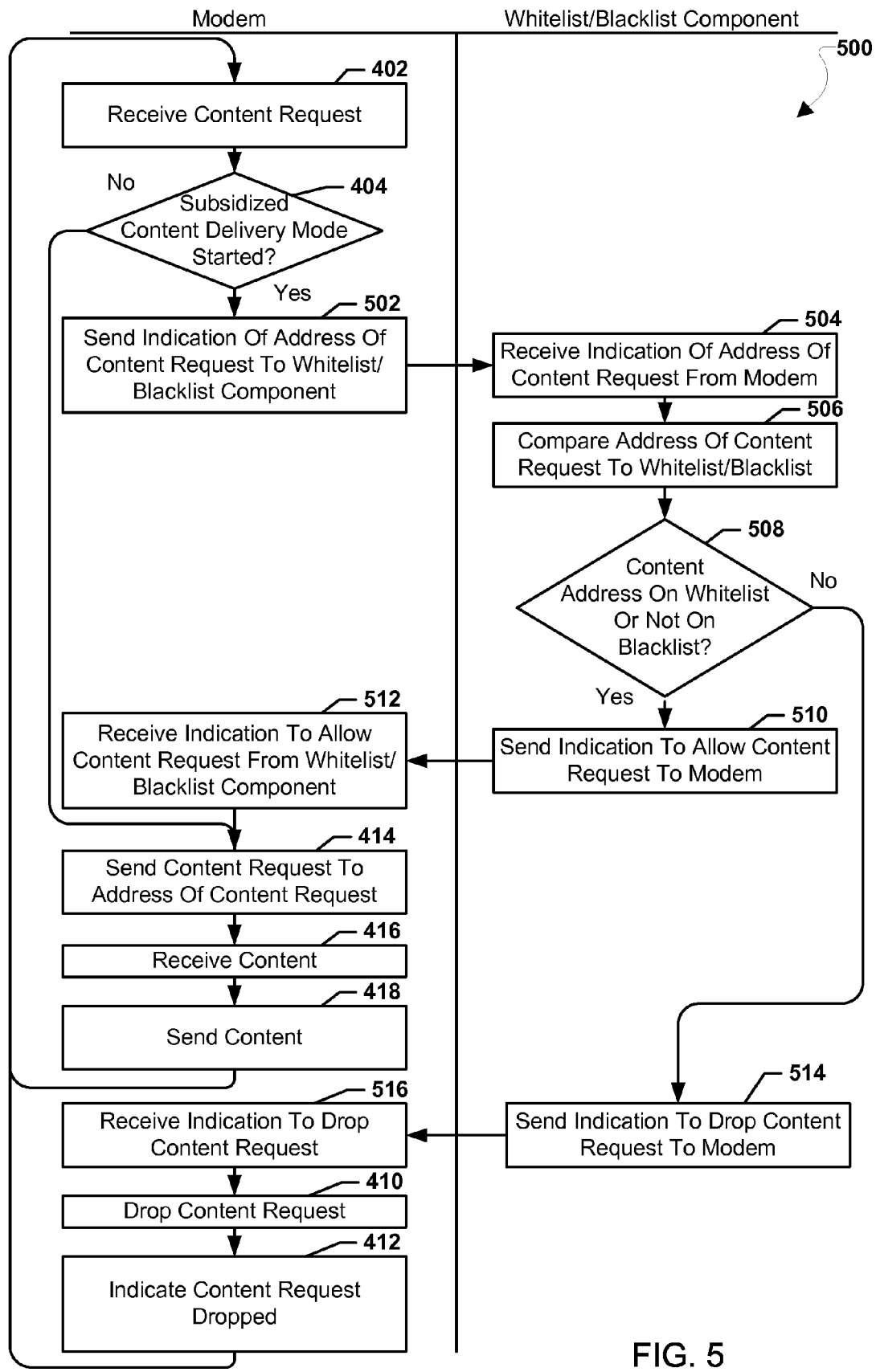
FIG. 5 is a process flow diagram illustrating another embodiment method for controlling access to content by a mobile device.

FIG. 5 illustrates an embodiment method 500 for controlling access to content by a mobile device. In an embodiment the operations of method 500 may be performed by a processor of a mobile device modem interfacing with a whitelist/blacklist component. The modem may also be in communication with an application processor of the mobile device and/or another entity, such as a remote policy server. In an embodiment, the operations of method 500 may be performed when a subsidized mode is activated in method 300 described above with reference to FIG. 3.

In blocks 402 and 404 the modem may perform like operations of like numbered blocks of method 400 described above with reference to FIG. 4. In response to determining that the subsidized content delivery mode is activated (i.e., determination block 404="Yes"), in block 502 the modem may send an indication of the address of the content request to the whitelist/blacklist component.

In block 504 the whitelist/blacklist component may receive the indication of the address from the modem. In block 506 the whitelist/blacklist component may compare the address of the content request to a whitelist and/or blacklist stored in the whitelist/blacklist component memory. In an embodiment the whitelist and/or blacklist may be a list of addresses, such as IP addresses, stored in the whitelist/blacklist component memory. In determination block 508 the whitelist/blacklist component may determine whether the content address is on the whitelist or not on the blacklist. This determination in block 508 may compare an address of the content request that is a regular expression-style URL against listing of regular expression-style URLs in the whitelist or blacklist. Also, the determination of whether the content address is on the whitelist or not on the blacklist may be performed for URLs of pages within a website and not the whole site. In this manner, the whitelist/blacklist component may determine whether the content request is authorized based on the comparison of the address of the content request to the list of addresses. In response to determining that the content is not authorized (i.e., determination block 508="No"), in block 514 the whitelist/blacklist component may send an indication to drop the content request to the modem. In block 516 the modem may receive the indication to drop the content request. In block 410 the modem may drop the content request. In block 412 the modem may indicate the content request was dropped as described above. Upon indicating that the content request was dropped, the modem may return to block 402 to receive the next content request.

In response to determining that the content request is authorized (i.e., determination block 508="Yes"), the whitelist/blacklist component may send an indication to allow the content request to the modem. In block 512 the modem may receive the indication to allow the content request from the whitelist/blacklist component. In response to receiving the indication to allow the content request in block 512, or in response to determining that the subsidized content delivery mode is not activated (i.e., determination block 404="No"), the modem may send the content request to the address of the content request in block 414. In block 416 the modem may receive the content from the location (e.g., a server) at the address of the content request. In block 418 the modem may send the content as described above. Upon sending the content, the modem may return to block 402 to receive the next content request.

Figure 6:
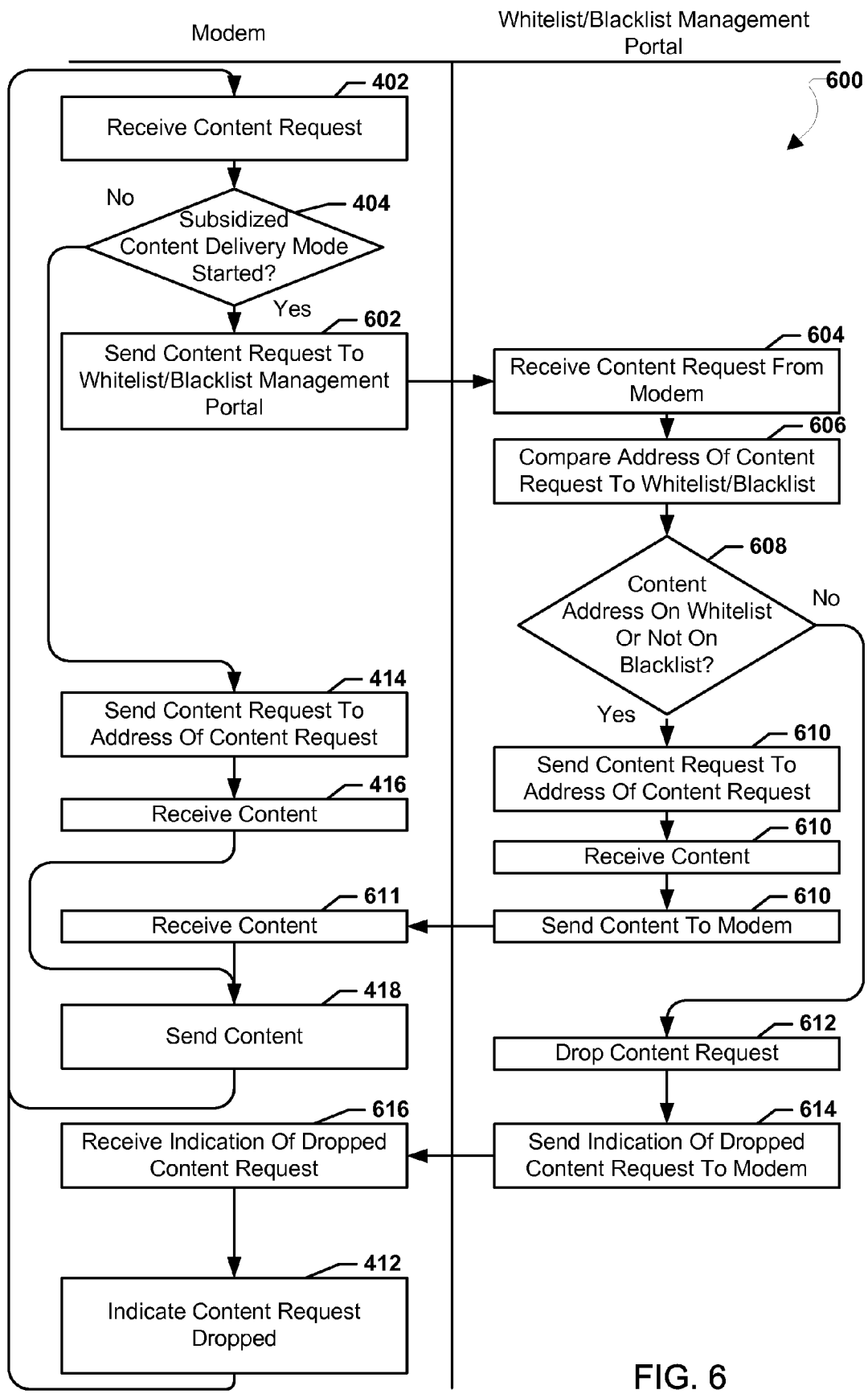
FIG. 6 is a process flow diagram illustrating a third embodiment method for controlling access to content by a mobile device.

FIG. 6 illustrates another embodiment method 600 for controlling access to content by a mobile device that may be performed by a processor of a mobile device modem in communication with a whitelist/blacklist management portal, such as a remote server. The modem may also be in communication with an application processor of the mobile device and/or another entity, such as a remote policy server. In an embodiment, the operations of method 600 may be performed when a subsidized mode is activated in method 300 described above with reference to FIG. 3.

In blocks 402 and 404 the modem may perform like operations of like numbered blocks of method 400 described above with reference to FIG. 4. In response to determining that the subsidized content delivery mode is activated (i.e., determination block 404="Yes"), in block 602 the modem may send an indication of the content request to the whitelist/blacklist management portal. In block 604 the whitelist/blacklist management portal may receive a content request from the modem.

In block 606 the whitelist/blacklist management portal may compare the address of the content request to a whitelist and/or blacklist stored in the whitelist/blacklist management portal memory. In an embodiment, the whitelist and/or blacklist may be a list of addresses, such as IP addresses, stored in the whitelist/blacklist management portal memory. In determination block 608 the whitelist/blacklist management portal may determine whether the content address is on the whitelist or not on the blacklist. This determination in block 608 may compare an address of the content request that is a regular expression-style URL against listing of regular expression-style URLs in the whitelist or blacklist.

Also, the determination of whether the content address is on the whitelist or not on the blacklist may be performed for URLs of pages within a website and not the whole site. In this manner, the whitelist/blacklist management portal may determine whether the content request is authorized based on the comparison of the address of the content request to the list of addresses. In response to determining that the content is not authorized (i.e., determination block 608="No"), the whitelist/blacklist management portal may drop the content request in block 612. In block 614 the whitelist/blacklist management portal may send an indication of the dropped content request to the modem. In block 616 the modem may receive the indication of the dropped content request. In block 412 the modem may indicate that the content request was dropped as described above. Upon indicating that the content request was dropped, the modem may return to block 402 to receive the next content request.

In response to determining that the content request is authorized (i.e., determination block 608="Yes"), the whitelist/blacklist management portal may send the content request to the address of the content request. In block 610 the whitelist/blacklist management portal may receive the content from the location (e.g., a server) at the address of the content request. In block 610 the whitelist/blacklist management portal may send the received content to the modem. In block 611 the modem may receive the received content from the whitelist/blacklist management portal.

In response to determining that the subsidized content delivery mode is not activated (i.e., determination block 404="No"), in block 414 the modem may send the content request to the address of the content request. In block 416 the modem may receive the content from the location (e.g., a server) at the address of the content request.

In response to receiving the content in blocks 416 or 611, the modem may send the content as described above in block 418. Upon sending the content, the modem may return to block 402 to receive the next content request.

Figure 7:
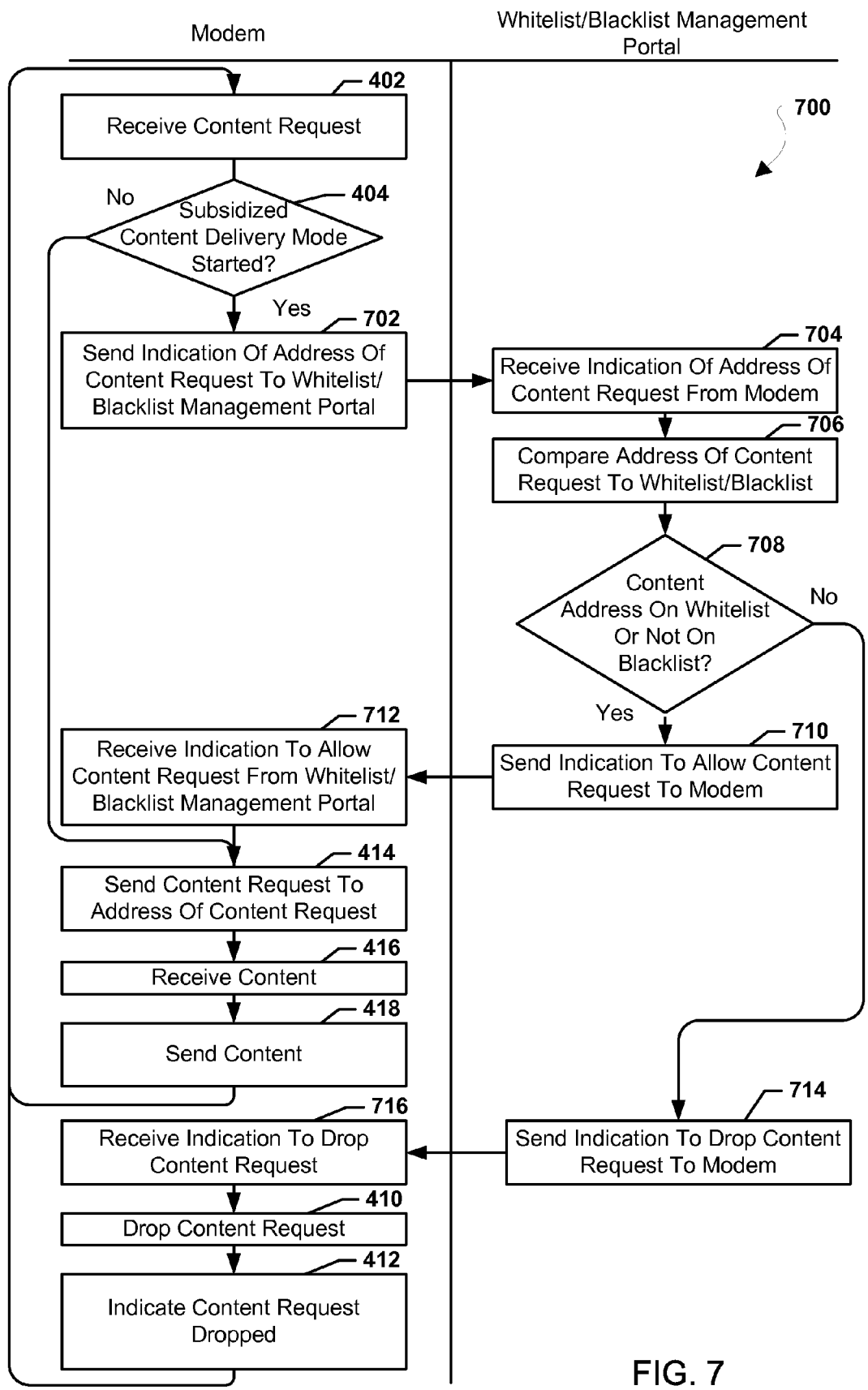
FIG. 7 is a process flow diagram illustrating a fourth embodiment method for controlling access to content by a mobile device.

FIG. 7 illustrates an embodiment method 700 for controlling access to content by a mobile device that may be performed by a processor of a mobile device modem in communication with a whitelist/blacklist management portal, such as a remote server. The modem may also be in communication with an application processor of the mobile device and/or another entity, such as a remote policy server. In an embodiment, the operations of method 700 may be performed when a subsidized mode is activated in method 300 described above with reference to FIG. 3.

In blocks 402 and 404 the modem may perform the operations of like numbered blocks of method 400 described above with reference to FIG. 4. In response to determining that the subsidized content delivery mode is activated (i.e., determination block 404="Yes"), the modem may send an indication of the address of the content request to the whitelist/blacklist management portal in block 702.

In block 704 the whitelist/blacklist management portal may receive the indication of the address from the modem. In block 706 the whitelist/blacklist management portal may compare the address of the content request to a whitelist and/or blacklist stored in the whitelist/blacklist management portal memory. In an embodiment the whitelist and/or blacklist may be a list of addresses, such as IP addresses and URLs, stored in the whitelist/blacklist management portal memory. In determination block 708 the whitelist/blacklist management portal may determine whether the content address is on the whitelist and/or not on the blacklist. This determination in block 708 may compare an address of the content request that is a regular expression-style URL against listing of regular expression-style URLs in the whitelist or blacklist. Also, the determination of whether the content address is on the whitelist or not on the blacklist may be performed for URLs of pages within a website and not the whole site. In this manner, the whitelist/blacklist management portal may determine whether the content request is authorized based on the comparison of the address of the content request to the list of addresses in whitelists or blacklists. In response to determining that the content is not authorized (i.e., determination block 708="No"), the whitelist/blacklist management portal may send an indication to drop the content request to the modem in block 714. In block 716 the modem may receive the indication to drop the content request. In block 410 the modem may drop the content request. In block 412 the modem may indicate that the content request was dropped as described above. Upon indicating that the content request was dropped, the modem may return to block 402 to receive the next content request.

In response to determining that the content request is authorized (i.e., determination block 708="Yes"), the whitelist/blacklist management portal may send an indication to allow the content request to the modem in block 710. In block 712 the modem may receive the indication to allow the content request from the whitelist/blacklist management portal. In response to receiving the indication to allow the content request in block 712, or in response to determining that the subsidized content delivery mode is not activated (i.e., determination block 404="No"), the modem may send the content request to the address of the content request in block 414. In block 416 the modem may receive the content from the location (e.g., a server) at the address of the content request. In block 418 the modem may send the content as described above. Upon sending the content, the modem may return to block 402 to receive the next content request.

Figure 8A:
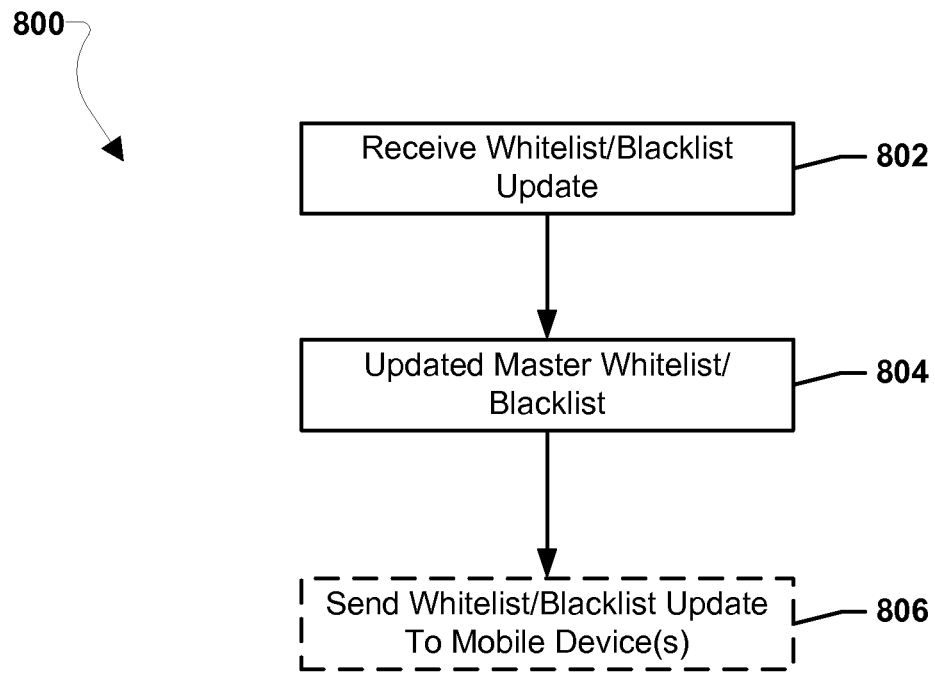
FIGS. 8A and 8B are process flow diagrams illustrating embodiment methods for updating lists of addresses.
Figure 8B:
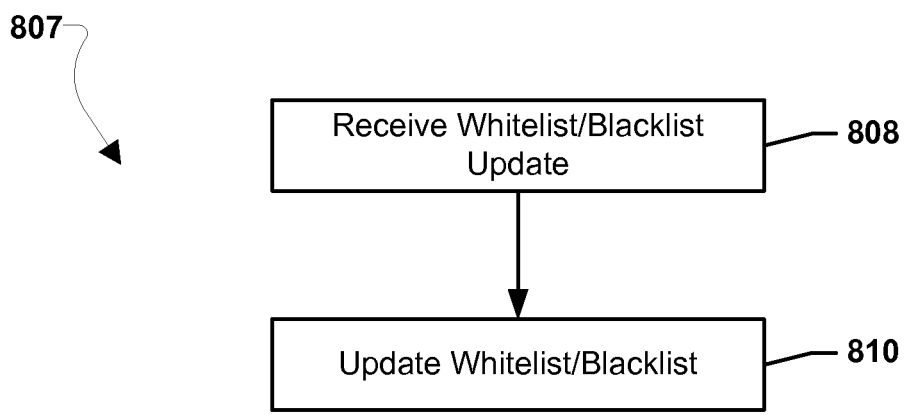

FIGS. 8A and 8B are process flow diagrams illustrating embodiment methods for updating lists of addresses in whitelists and/or blacklists. FIG. 8A illustrates an embodiment method 800 for updating a master whitelist/blacklist at a whitelist/blacklist management portal. In an embodiment, the operations of method 800 may be performed in conjunction with the operations of methods 300-700 described above with reference to FIGS. 3-7. In block 802 the whitelist/blacklist management portal may receive a whitelist/blacklist update from an authority authorized to identify authorize and/or unauthorized addresses. In block 804 the whitelist/blacklist management portal may update the master whitelist/blacklist to include the received updated data. In block 806 the whitelist/blacklist management portal may send the whitelist/blacklist update to one or more mobile devices to update the whitelists/blacklists stored in either a modem or a whitelist/blacklist component the mobile devices.

FIG. 8B illustrates an embodiment method 807 for updating a whitelist/blacklist stored on a modem and/or a whitelist/blacklist component. In an embodiment, the operations of method 807 may be performed in conjunction with the operations of methods 300-800 described above with reference to FIGS. 3-8A. In block 808 the modem or whitelist/blacklist component may receive a whitelist/blacklist update from a whitelist/blacklist management portal or server. In block 810 the modem or whitelist/blacklist component may update the whitelists/blacklists at the mobile device modem or whitelist/blacklist component.

While various embodiments are discussed above in terms of outbound content requests being filtered by the modem, whitelist/blacklist component, and/or whitelist/blacklist management portal, the various embodiment methods, systems, and devices may be applied to filter inbound content as well. Thus, rather than or in addition to filtering content requests before the content requests are sent by the modem or whitelist/blacklist management portal, received content may be filtered against the whitelist and/or blacklist of the modem, whitelist/blacklist component, and/or whitelist/blacklist management portal (e.g., by comparing the sender or source address of the received content against the whitelist and/or blacklist) and the received content itself may be dropped based on the comparison of the content's address to the whitelist and/or blacklist addresses.

Figure 9:
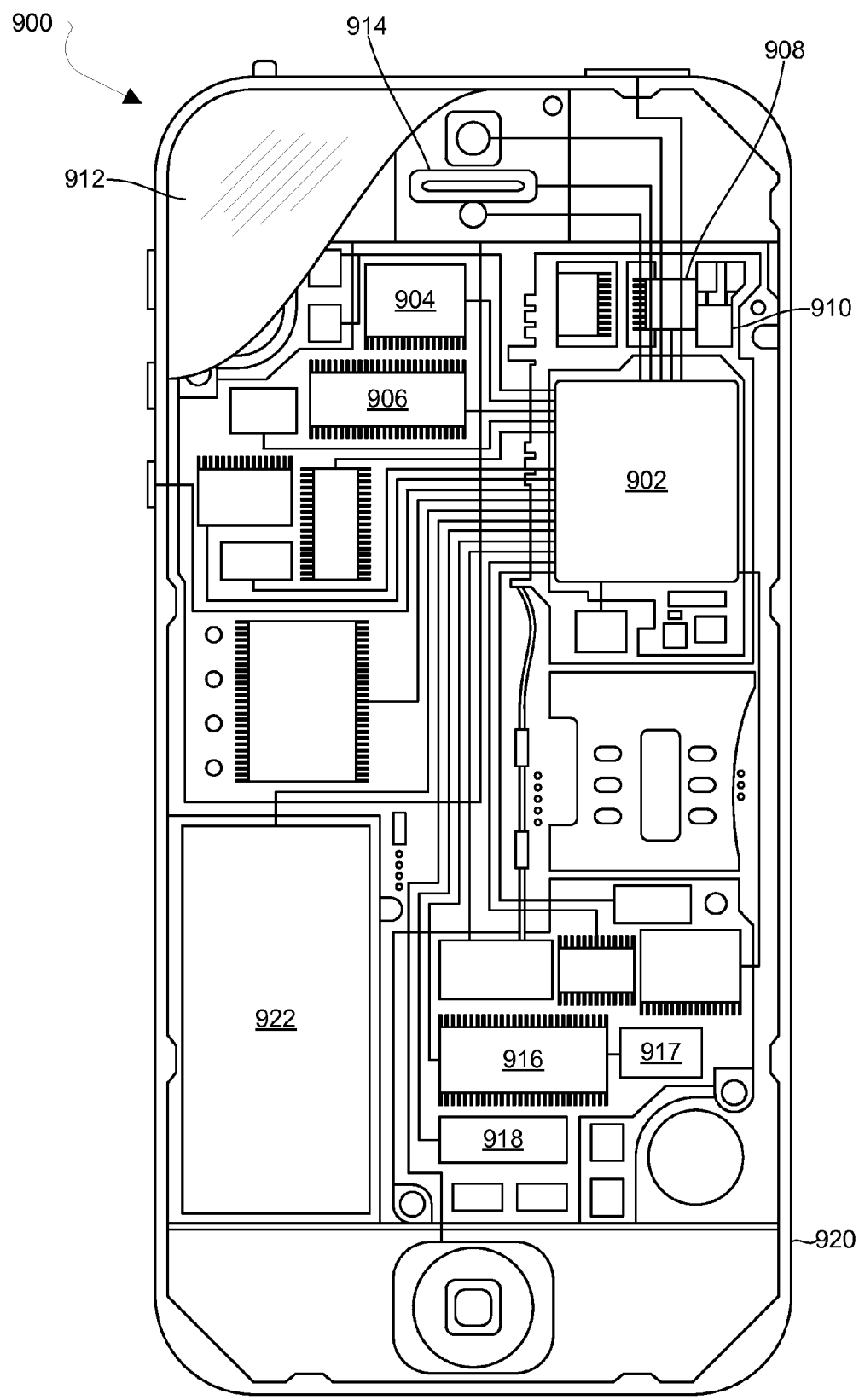
FIG. 9 is a component diagram of an example mobile device suitable for use with the various embodiments.

The various embodiments may be implemented in any of a variety of mobile devices, an example of which is illustrated in FIG. 9. For example, the mobile device 900 may include a processor 902 coupled to internal memories 904 and 906. Internal memories 904 and 906 may be volatile or non-volatile memories, and may also be secure and/or encrypted memories, or unsecure and/or unencrypted memories, or any combination thereof. The processor 902 may also be coupled to a touch screen display 912, such as a resistive-sensing touch screen, capacitive-sensing touch screen infrared sensing touch screen, or the like. Additionally, the display of the mobile device 900 need not have touch screen capability.

The mobile device 900 may have one or more radio signal transceivers 908 (e.g., Peanut®, Bluetooth®, Zigbee®, Wi-Fi, RF radio) and antennae 910, for sending and receiving, coupled to each other and/or to the processor 902. The mobile device 900 may include a cellular network interface, such as wireless modem or modem chip 916 including a processor. The modem or modem chip 916 may enable communication via wide area network, such as a cellular data network (e.g., CDMA, TDMA, GSM, PCS, 3G, 4G, LTE, or any other type of cellular data network) and may be coupled to the processor 902. In an optional embodiment, the modem or modem chip 916 may be coupled to a component 917, including a processor and/or memory to support the modem or modem chip 916 in controlling access to content. The modem or modem chip 916 and component 917 may be completely separate pieces of hardware or may be hardware components on the same chip.

The mobile device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port. The mobile device 900 may also include speakers 914 for providing audio outputs. The mobile device 900 may also include a housing 920, constructed of a plastic, metal, or a combination of materials, for containing all or some of the components discussed herein. The mobile device 900 may include a power source 922 coupled to the processor 902, such as a disposable or rechargeable battery. The rechargeable battery may also be coupled to the peripheral device connection port to receive a charging current from a source external to the mobile device 900.

Figure 10:
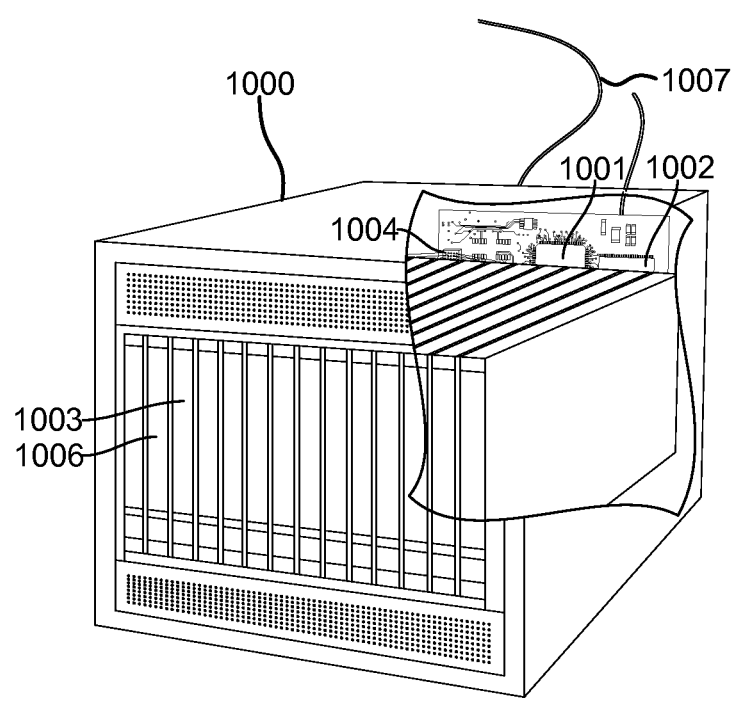
FIG. 10 is a component diagram of an example server suitable for use with the various embodiments.

The various embodiments may also be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing network interface connections with a network 1007, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 902, 1001, modem or modem chip 916, and optional component 917 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 902, 1001, modem or modem chip 916, and optional component 917. The processors 902, 1001, modem or modem chip 916, and optional component 917 may include internal memory sufficient to store the application software instructions. In many devices the internal memory may be a volatile or nonvolatile memory, such as flash memory, or a mixture of both. For the purposes of this description, a general reference to memory refers to memory accessible by the processors 902, 1001, modem or modem chip 916, and optional component 917 including internal memory or removable memory plugged into the mobile device and memory within the processors 902, 1001, modem or modem chip 916, and optional component 917 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for controlling access to content by a mobile device, comprising:

receiving, in a modem of the mobile device, the modem configured to control content independent of an application processor of the mobile device, a content request from the application processor of the mobile device;

determining, in the modem, whether a subsidized content delivery mode is activated; and in response to determining that the subsidized content delivery mode is activated, filtering, by the modem, the content request such that the content request is dropped when not authorized.

2. The method of claim 1, further comprising:
in response to determining that the subsidized content delivery mode is not activated, sending, by the modem, the content request without filtering.

3. The method of claim 1, wherein filtering, by the modem, the content request such that the content request is dropped when not authorized comprises:
comparing, in the modem, an address of the content request to a list of addresses stored in memory of the modem in response to determining that the subsidized content delivery mode is activated;
determining, in the modem, whether the content request is authorized based on the comparison of the address of the content request to the list of addresses stored in the memory of the modem;
sending, by the modem, the content request to the address of the content request in response to determining that the content request is authorized; and
dropping the content request by the modem in response to determining that the content request is not authorized.

4. The method of claim 3, wherein the address of the content request is one or more of an IP address, a domain name, and a TCP/UDP port.

5. The method of claim 1, wherein filtering, by the modem, the content request such that the content request is dropped when not authorized comprises:
sending, from the modem, an indication of an address of the content request to a list component of the mobile device in response to determining that the subsidized content delivery mode is activated;
comparing, in the list component, the address of the content request to a list of addresses stored in memory of the list component or modem;
determining, in the list component, whether the content request is authorized based on the comparison of the address of the content request to the list of addresses stored in the memory of the list component or modem;
sending, from the list component to the modem, an indication to allow the content request in response to determining that the content request is authorized;
sending, from the list component to the modem, an indication to drop the content request in response to determining that the content request is not authorized;
sending, by the modem, the content request to the address of the content request in response to receiving from the list component the indication to allow the content request; and
dropping the content request by the modem in response to receiving the indication to drop the content request from the list component.

6. The method of claim 5, wherein the modem and the list component are different cores of a multi-core processor or the modem and the list component are separate processors on a single system on chip.

7. The method of claim 1, wherein filtering, by the modem, the content request such that the content request is dropped when not authorized comprises:
sending the content request from the modem to a list management portal in response to determining that the subsidized content delivery mode is activated;
comparing, in the list management portal, an address of the content request to a list of addresses stored in the list management portal;
determining, in the list management portal, whether the content request is authorized based on the comparison of the address of the content request to the list of addresses stored in the list management portal;
dropping, in the list management portal, the content request in response to determining that the content request is not authorized;
sending the content request from the list management portal to the address of the content request in response to determining that the content request is authorized;
receiving, in the list management portal, content in response to the sent content request; and
sending the content from the list management portal to the modem.

8. The method of claim 1, wherein filtering, by the modem, the content request such that the content request is dropped when not authorized comprises:
sending an indication of an address of the content request from the modem to a list management portal in response to determining that the subsidized content delivery mode is activated;
comparing, in the list management portal, the address of the content request to a list of addresses stored in the list management portal;
determining, in the list management portal, whether the content request is authorized based on the comparison of the address of the content request to the list of addresses stored in the list management portal;
sending an indication to allow the content request from the list management portal to the modem in response to determining that the content request is authorized;
sending an indication to drop the content request from the list management portal to the modem in response to determining that the content request is not authorized;
sending the content request from the modem to the address of the content request in response to receiving the indication to allow the content request from the list management portal; and
dropping the content request by the modem in response to receiving the indication to drop the content request from the list management portal.

9. The method of claim 1, wherein determining, in the modem, whether a subsidized content delivery mode is activated comprises determining whether a subsidized content delivery mode start indication is received from an application processor.

10. The method of claim 1, further comprising indicating that the content request is dropped when not authorized via a specialized status code.

11. The method of claim 10, wherein the specialized status code is a HTTP response code.

12. A mobile device, comprising:
a memory; and
a modem processor connected to the memory, wherein the modem processor controls content independent of the application processor and is configured with processor executable instructions to perform operations comprising:
receiving a content request from the application processor of the mobile device;
determining whether a subsidized content delivery mode is activated; and
in response to determining that the subsidized content delivery mode is activated, filtering the content request such that the content request is dropped when not authorized.

13. The mobile device of claim 12, wherein the modem processor is configured with processor executable instructions to perform operations further comprising:

in response to determining that the subsidized content delivery mode is not activated, sending the content request without filtering.

14. The mobile device of claim 13, wherein means for filtering the content request such that the content request is dropped when not authorized comprises:
    means for comparing an address of the content request to a list of addresses stored in a memory in response to determining that the subsidized content delivery mode is activated;
    means for determining whether the content request is authorized based on the comparison of the address of the content request to the list of addresses stored in the memory;
    means for sending the content request to the address of the content request in response to determining that the content request is authorized; and
    means for dropping the content request in response to determining that the content request is not authorized.

15. The mobile device of claim 13, wherein the modem processor is configured with processor executable instructions to perform operations such that filtering the content request such that the content request is dropped when not authorized comprises:
    comparing an address of the content request to a list of addresses stored in the memory in response to determining that the subsidized content delivery mode is activated;
    determining whether the content request is authorized based on the comparison of the address of the content request to the list of addresses stored in the memory;
    sending the content request to the address of the content request in response to determining that the content request is authorized; and
    dropping the content request in response to determining that the content request is not authorized.

16. The mobile device of claim 14, wherein the address of the content request is one or more of an IP address, a domain name, and a TCP/UDP port.

17. The mobile device of claim 15, wherein the address of the content request is one or more of an IP address, a domain name, and a TCP/UDP port.

18. The mobile device of claim 12, further comprising:
    a list component connected to the memory and the modem processor,
    wherein the modem processor is configured with processor executable instructions to perform operations such that filtering the content request such that the content request is dropped when not authorized comprises sending an indication of an address of the content request to the list component in response to determining that the subsidized content delivery mode is activated,
    wherein the list component is configured with processor executable instructions to perform operations comprising:
        comparing the address of the content request to a list of addresses stored in the memory;
        determining whether the content request is authorized based on the comparison of the address of the content request to the list of addresses stored in the memory; and
        sending an indication to the modem processor to allow the content request in response to determining that the content request is authorized; and
        sending an indication to the modem processor to drop the content request in response to determining that the content request is not authorized, and
    wherein the modem processor is configured with processor executable instructions to perform operations such that filtering the content request such that the content request is dropped when not authorized further comprises:
        sending the content request to the address of the content request in response to receiving from the list component the indication to allow the content request; and
        dropping the content request in response to receiving the indication to drop the content request from the list component.

19. The mobile device of claim 18, wherein the modem processor and the list component are different cores of a multi-core processor or the modem processor and the list component are separate processors on a single system on chip.

20. The mobile device of claim 12, further comprising an application processor connected to the modem processor,
    wherein the modem processor is configured with processor executable instructions to perform operations such that determining whether a subsidized content delivery mode is activated comprises determining whether a subsidized content delivery mode start indication is received from the application processor.

21. The mobile device of claim 12, wherein the modem processor is configured with processor executable instructions to perform operations further comprising indicating that the content request is dropped when not authorized via a specialized status code.

22. The mobile device of claim 21, wherein the specialized status code is a HTTP response code.

23. A mobile device, comprising:
    a modem configured to control content independent of an application processor of the mobile device, comprising:
        means for receiving a content request from the application processor of the mobile device;
        means for determining whether a subsidized content delivery mode is activated; and
        means for filtering the content request such that the content request is dropped when not authorized in response to determining that the subsidized content delivery mode is activated.

24. The mobile device of claim 23, wherein the modem further comprises:
    means for sending the content request without filtering in response to determining that the subsidized content delivery mode is not activated.

25. The mobile device of claim 23, further comprising a list component,
    wherein means for filtering the content request such that the content request is dropped when not authorized comprises means for sending an indication of an address of the content request to the list component in response to determining that the subsidized content delivery mode is activated,
    wherein the list component comprises:
        means for comparing the address of the content request to a list of addresses stored in the memory;
        means for determining whether the content request is authorized based on the comparison of the address of the content request to the list of addresses stored in the memory; and means for sending an indication to the modem to allow the content request in response to determining that the content request is authorized; and means for sending an indication to the modem to drop the content request in response to determining that the content request is not authorized, and wherein means for filtering the content request such that the content request is dropped when not authorized further comprises:

means for sending the content request to the address of the content request in response to receiving from the list component the indication to allow the content request; and means for dropping the content request in response to receiving the indication to drop the content request from the list component.

26. The mobile device of claim 25, wherein the modem and the list component are different cores of a multi-core processor or the modem and the list component are separate processors on a single system on chip.

27. The mobile device of claim 23, wherein means for determining whether a subsidized content delivery mode is activated comprises means for determining whether a subsidized content delivery mode start indication is received from an application processor.

28. The mobile device of claim 23, wherein the modem further comprises means for indicating that the content request is dropped when not authorized via a specialized status code.

29. The mobile device of claim 28, wherein the specialized status code is a HTTP response code.

30. A non-transitory processor readable medium having stored thereon processor executable instructions configured to cause a modem processor to perform operations comprising:

receiving a content request from an application processor;
determining whether a subsidized content delivery mode is activated; and
in response to determining that the subsidized content delivery mode is activated, filtering the content request such that the content request is dropped when not authorized, wherein the modem processor controls content independent of the application processor.

31. The non-transitory processor readable medium of claim 30, wherein the stored processor executable instructions are configured to cause the modem processor to perform operations further comprising:

in response to determining that the subsidized content delivery mode is not activated, sending the content request without filtering.

32. The non-transitory processor readable medium of claim 31, wherein the stored processor executable instructions are configured to cause the modem processor to perform operations such that filtering the content request such that the content request is dropped when not authorized comprises:

comparing an address of the content request to a list of addresses stored in a memory in response to determining that the subsidized content delivery mode is activated;
determining whether the content request is authorized based on the comparison of the address of the content request to the list of addresses stored in the memory;
sending the content request to the address of the content request in response to determining that the content request is authorized; and
dropping the content request in response to determining that the content request is not authorized.

33. The non-transitory processor readable medium of claim 32, wherein the stored processor executable instructions are configured to cause the modem processor to perform operations such that the address of the content request is one or more of an IP address, a domain name, and a TCP/UDP port.

34. The non-transitory processor readable medium of claim 30, wherein the stored processor executable instructions are configured to cause the modem processor to perform operations such that filtering the content request such that the content request is dropped when not authorized comprises:

sending an indication of an address of the content request to a list component of the mobile device in response to determining that the subsidized content delivery mode is activated;
comparing the address of the content request to a list of addresses stored in memory;
determining whether the content request is authorized based on the comparison of the address of the content request to the list of addresses stored in the memory;
sending from the list component to the modem processor an indication to allow the content request in response to determining that the content request is authorized;
sending from the list component to the modem processor an indication to drop the content request in response to determining that the content request is not authorized;
sending the content request to the address of the content request in response to receiving from the list component the indication to allow the content request; and
dropping the content request in response to receiving the indication to drop the content request from the list component.

35. The non-transitory processor readable medium of claim 34, wherein the stored processor executable instructions are configured such that the modem processor and the list component are different cores of a multi-core processor.

36. The non-transitory processor readable medium of claim 30, wherein the stored processor executable instructions are configured such that determining whether a subsidized content delivery mode is activated comprises determining whether a subsidized content delivery mode start indication is received from an application processor.

37. The non-transitory processor readable medium of claim 30, wherein the stored processor executable instructions are configured further comprising indicating that the content request is dropped when not authorized via a specialized status code.

38. The non-transitory processor readable medium of claim 37, wherein the stored processor executable instructions are configured such that the specialized status code is a HTTP response code.

39. A system, comprising:
a list management portal, comprising:
a memory; and
a server connected to the memory; and
a mobile device, comprising:
a modem processor configured to control content independent of the application processor and is configured with processor executable instructions to perform operations comprising:
receiving a content request, from the application processor;
determining whether a subsidized content delivery mode is activated; and in response to determining that the subsidized content delivery mode is activated, filtering the content request such that the content request is dropped when not authorized.

40. The system of claim 39, wherein the modem processor is configured with processor executable instructions to perform operations such that filtering the content request such that the content request is dropped when not authorized comprises:
sending the content request to the server in response to determining that the subsidized content delivery mode is activated, and
wherein the server is configured with processor executable instructions to perform operations comprising:
comparing an address of the content request to a list of addresses stored in the memory;
determining whether the content request is authorized based on the comparison of the address of the content request to the list of addresses stored in the memory;
dropping the content request in response to determining that the content request is not authorized;
sending the content request to the address of the content request in response to determining that the content request is authorized;
receiving content in response to the sent content request; and
sending to the modem processor content corresponding to the content request.

41. The system of claim 39, wherein the modem processor is configured with processor executable instructions to perform operations such that filtering the content request such that the content request is dropped when not authorized comprises:
sending an indication of an address of the content request to the server in response to determining that the subsidized content delivery mode is activated;
wherein the server is configured with processor executable instructions to perform operations comprising:
comparing the address of the content request to a list of addresses stored in the memory;
determining whether the content request is authorized based on the comparison of the address of the content request to the list of addresses stored in the memory;
sending an indication to allow the content request from to the modem processor in response to determining that the content request is authorized; and
sending an indication to drop the content request to the modem processor in response to determining that the content request is not authorized, and
wherein the modem processor is configured with processor executable instructions to perform operations such that filtering the content request such that the content request is dropped when not authorized further comprises:
sending the content request to the address of the content request in response to receiving the indication to allow the content request from the server; and
dropping the content request in response to receiving the indication to drop the content request from the server.

42. The system of claim 39, wherein the mobile device further comprises an application processor, and
wherein the modem processor is configured with processor executable instructions to perform operations such that determining whether a subsidized content delivery mode is activated comprises determining whether a subsidized content delivery mode start indication is received from the application processor.

43. The system of claim 39, wherein the modem processor is configured with processor executable instructions to perform operations further comprising indicating that the content request is dropped when not authorized via a specialized status code.

44. The system of claim 43, wherein the specialized status code is a HTTP response code.

45. A system, comprising:
a list management portal; and
a mobile device, comprising:
a modem that controls content independent of an application processor of the mobile device, comprising:
means for receiving a content request from the application processor of the mobile device;
means for determining whether a subsidized content delivery mode is activated; and
means for in response to determining that the subsidized content delivery mode is activated, filtering the content request such that the content request is dropped when not authorized.

46. The system of claim 45, wherein means for filtering the content request such that the content request is dropped when not authorized comprises:
means for sending the content request to the list management portal in response to determining that the subsidized content delivery mode is activated, and
wherein the list management portal comprises:
means for comparing an address of the content request to a list of addresses stored in a memory;
means for determining whether the content request is authorized based on the comparison of the address of the content request to the list of addresses stored in the memory;
means for dropping the content request in response to determining that the content request is not authorized;
means for sending the content request to the address of the content request in response to determining that the content request is authorized;
means for receiving content in response to the sent content request; and
means for sending to the modem content corresponding to the content request.

47. The system of claim 45, wherein means for filtering the content request such that the content request is dropped when not authorized comprises:
means for sending the content request to the list management portal in response to determining that the subsidized content delivery mode is activated, and
wherein the list management portal comprises:
means for comparing an address of the content request to a list of addresses stored in a memory;
means for determining whether the content request is authorized based on the comparison of the address of the content request to the list of addresses stored in the memory;
means for sending an indication to allow the content request to the modem in response to determining that the content request is authorized; and
means for sending an indication to drop the content request to the modem in response to determining that the content request is not authorized, and wherein means for filtering the content request such that the content request is dropped when not authorized further comprises:
  means for sending the content request to the address of the content request in response to receiving the indication to allow the content request from the list management portal; and
  means for dropping the content request in response to receiving the indication to drop the content request from the list management portal.

48. The system of claim 45, wherein means for determining whether a subsidized content delivery mode is activated comprises means for determining whether a subsidized content delivery mode start indication is received from an application processor.

49. The system of claim 45, wherein the modem further comprises means for indicating that the content request is dropped when not authorized via a specialized status code.

50. The system of claim 49, wherein the specialized status code is a HTTP response code.

* * * * *